United States Patent
Stokes et al.

(10) Patent No.: US 9,904,834 B2
(45) Date of Patent: *Feb. 27, 2018

(54) TUNING PROCESS FOR A HANDHELD SCANNER

(71) Applicant: Cognex Corporation, Natick, MA (US)

(72) Inventors: Earle Stokes, Westford, MA (US); James A. Negro, Arlington, MA (US)

(73) Assignee: Cognex Corporation, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/131,778

(22) Filed: Apr. 18, 2016

(65) Prior Publication Data
US 2016/0307018 A1 Oct. 20, 2016

Related U.S. Application Data

(63) Continuation of application No. 14/161,330, filed on Jan. 22, 2014, now Pat. No. 9,317,730.

(51) Int. Cl.
*G06K 7/14* (2006.01)

(52) U.S. Cl.
CPC ......... *G06K 7/1456* (2013.01); *G06K 7/1417* (2013.01)

(58) Field of Classification Search
USPC .... 235/462.09, 462.08, 462.25, 462.42, 455; 382/128; 348/187, 222.1
See application file for complete search history.

(56) References Cited

U.S. PATENT DOCUMENTS

| | | |
|---|---|---|
| 4,877,949 A | 10/1989 | Danielson et al. |
| 5,378,883 A | 1/1995 | Batterman et al. |
| 6,078,390 A | 6/2000 | Bengtsson |
| 6,983,065 B1 | 1/2006 | Akgul et al. |
| 7,013,220 B2 | 3/2006 | Dorsel et al. |
| 7,089,123 B2 | 8/2006 | Corson et al. |
| 7,296,749 B2 | 11/2007 | Massieu |
| 8,189,887 B2 * | 5/2012 | Kollias ................ A61B 5/0071 348/187 |
| 8,285,492 B2 | 10/2012 | Gunstream |
| 8,469,276 B1 | 6/2013 | Nunnink |
| 8,482,248 B2 | 7/2013 | Klicpera |
| 8,517,273 B2 | 8/2013 | Tamburrini et al. |
| 8,556,179 B2 | 10/2013 | Gillet |

(Continued)

*Primary Examiner* — Allyson Trail
(74) *Attorney, Agent, or Firm* — Quarles & Brady LLP

(57) ABSTRACT

Methods and systems for auto-tuning a handheld scanning device that can account for changes in the orientation between the handheld scanning device and a presented symbol can include capturing a first image containing a presented symbol, recording an orientation parameter and parameters associated with capturing the first image containing the presented symbol, capturing a subsequent image containing the presented symbol, recording an orientation parameter of the presented symbol contained in the subsequent image, comparing the orientation parameter of the symbol contained in the subsequent images to the orientation parameter of the presented symbol contained in the subsequent image, determining if the orientation parameter of the presented symbol contained in the subsequent images is substantially similar to the orientation parameter of the symbol contained in the first image, and recording parameters associated with capturing the subsequent images containing the presented symbol.

19 Claims, 7 Drawing Sheets

(56) References Cited

U.S. PATENT DOCUMENTS

| | | | |
|---|---|---|---|
| 2007/0125863 A1 | 6/2007 | Jakoboski et al. | |
| 2008/0105749 A1* | 5/2008 | Lei | G06K 7/10722 |
| | | | 235/462.42 |
| 2009/0268953 A1 | 10/2009 | Crucs | |
| 2011/0150447 A1* | 6/2011 | Li | G06T 7/0069 |
| | | | 396/104 |
| 2012/0000982 A1* | 1/2012 | Gao | G06K 7/146 |
| | | | 235/455 |
| 2012/0007839 A1* | 1/2012 | Tsao | G02B 26/00 |
| | | | 345/204 |
| 2012/0048937 A1* | 3/2012 | Dahari | G06K 7/14 |
| | | | 235/462.08 |
| 2012/0199655 A1 | 8/2012 | Fukuba | |
| 2013/0315369 A1 | 11/2013 | Turner | |
| 2014/0133840 A1* | 5/2014 | Bao | H04N 5/232 |
| | | | 386/328 |
| 2015/0053737 A1* | 2/2015 | Leimbach | A61B 17/07207 |
| | | | 227/175.1 |
| 2015/0053767 A1* | 2/2015 | Sackett | G06K 7/1465 |
| | | | 235/462.06 |

* cited by examiner

TUNING PROCESS FOR A HANDHELD SCANNER

CROSS-REFERENCE TO RELATED APPLICATIONS

This application is a continuation of U.S. patent application Ser. No. 14/161,330 filed Jan. 22, 2014 (now U.S. Pat. No. 9,317,730) of which is incorporated herein by reference in its entirety.

STATEMENT REGARDING FEDERALLY SPONSORED RESEARCH OR DEVELOPMENT

Not applicable.

BACKGROUND OF THE TECHNOLOGY

The present technology relates to optical imaging systems, and more specifically, to a tuning process for a handheld scanner.

One of the most common imaging system configurations is a handheld scanner typically used for reading symbols, fonts or marks on packages or articles. It is important for imaging systems to achieve a quality scan so the image can be electronically searched, stored more compactly, displayed on-line, and used in a variety of machine related processes, including machine translation, text-to-speech, symbol verification and text mining applications.

With a handheld scanner, it can be necessary to tune the scanning device to ensure accurate and timely acquisition of presented target symbols. Current prior devices include multiple lighting options to ensure accurate acquisition of a presented target symbol. Other prior devices provided variable focus functionality to allow for better presented target symbol acquisition. Further devices allowed for both variable focus functionality and variable lighting functionality which could present a user with a complex set of parameters that must be user configured in order to effectively tune a handheld scanner.

When illumination is integrated into an imaging system, and more particularly a handheld scanner, the distribution of illumination on an object usually varies with the distance between the object and the vision sensor in the handheld scanner. Proper light distribution is especially important in applications such as reading dot-peen 2D codes with low-angle illumination or verification of direct part marking (DPM) codes, for example.

Furthermore, in handheld scanner applications, it can be difficult to keep the handheld scanner at a proper focal distance where the depth of field is very small, such as when a mark is very small or includes low contrast. As with any imaging device, providing quality results for each image scan can be difficult taking into consideration the numerous variables that affect the quality of an image scan.

With the introduction of variable lighting and focus parameters, the complexity of properly configuring a scanning device has increased significantly. Often, a user is forced to configure the scanner using an elaborate configuration interface. The configuration interface often requires the use of a personal computer (PC) and dedicated software to properly tune the scanning device.

Stationary scanning devices have overcome some of the above issues by incorporating an auto-tuning functionality. However, handheld scanners have presented a more difficult platform to provide with auto-tuning functionality. This is often due to the inconsistent orientation between the scanner and the target symbol due to the movement of the user holding the scanner.

Therefore, what is needed are systems and methods that can allow for a handheld scanner to have an auto-tuning functionality that can account for deficiencies in current handheld scanners.

BRIEF SUMMARY OF THE TECHNOLOGY

The present embodiments overcome the aforementioned problems by providing methods and systems for auto-tuning a handheld scanner. The methods and systems can estimate or measure the relative motion of the scanner and presented symbol to determine the orientation of presented symbols contained in captured images and use only those images where the orientation of the presented symbol is substantially similar to the presented symbol in a first presented image. First, the symbol found in the first image can be compared to the symbol in the subsequent image in order to ensure the image is of the same physical symbol mark. In practice, properties of the physical symbol mark such as number of rows and columns or encoded data can be used. In some applications, identical symbol marks may be present and in this instance other constraints such as maximum acceptable reader motion may be used. After the symbol in the first and subsequent images is confirmed to be identical, the comparison of the orientation of the first presented symbol and the orientation of the subsequent presented symbol can be used to abort or otherwise modify the tuning process. Alternative embodiments include restarting the tuning using the subsequent symbol orientation as the new first symbol orientation, ignoring the subsequent image parameters from the tuning process, and retesting the subsequent image parameters by acquiring a new image with the same parameters as the subsequent image capture.

Accordingly, embodiments of the present technology include a method for tuning a handheld scanning device. The method comprises capturing a first image, the first image containing a presented symbol; recording at least one orientation parameter of the presented symbol contained in the first image; recording at least one of a plurality of parameters associated with capturing the first image containing the presented symbol; capturing a subsequent image, the subsequent image containing the presented symbol; recording at least one orientation parameter of the presented symbol contained in the subsequent image; comparing the at least one orientation parameter of the presented symbol contained in the subsequent image to the at least one orientation parameter of the presented symbol contained in the first image; determining if the at least one orientation parameter of the presented symbol contained in the subsequent image is substantially similar to the at least one orientation parameter of the presented symbol contained in the first image; and recording at least one of a plurality of parameters associated with capturing the subsequent image containing the presented symbol when the at least one orientation parameter of the presented symbol contained in the subsequent image is substantially similar to the at least one orientation parameter of the presented symbol contained in the first image.

In accordance with another embodiment of the technology, embodiments of the present technology include a method for auto-tuning a handheld scanning device. The method comprises capturing a first image, the first image containing a presented symbol; recognizing the presented symbol contained in the first image; recording at least one orientation parameter of the presented symbol contained in the first image; recording at least one of a plurality of parameters associated with capturing the first image containing the presented symbol; capturing a subsequent image, the subsequent image containing the presented symbol; recognizing the presented symbol contained in the subsequent image; recording at least one orientation parameter of the presented symbol contained in the subsequent image; comparing the at least one orientation parameter of the presented symbol contained in the subsequent image to the at least one orientation parameter of the presented symbol contained in the first image; determining if the at least one orientation parameter of the presented symbol contained in the subsequent image is substantially similar to the at least one orientation parameter of the presented symbol contained in the first image; and performing a non-substantially similar orientation function when the at least one orientation parameter of the presented symbol contained in the subsequent image is not substantially similar to the at least one orientation parameter of the presented symbol contained in the first image.

In accordance with another embodiment of the technology, embodiments of the present technology include an auto-tuning handheld scanning device for recognizing presented symbols. The device comprises an image sensor; a memory operatively coupled to the image sensor; and a processor operatively coupled to the image sensor and the memory, the processor programmed to perform the steps of: capturing a first image with the image sensor, the first image containing a presented symbol; storing at least one orientation parameter of the presented symbol contained in the first image in the memory; storing at least one of a plurality of parameters associated with capturing the first image containing the presented symbol; capturing a subsequent image with the image sensor, the subsequent image containing the presented symbol; storing at least one orientation parameter of the presented symbol contained in the subsequent image in the memory; comparing the at least one orientation parameter of the presented symbol contained in the subsequent image to the at least one orientation parameter of the presented symbol contained in the first image; determining if the at least one orientation parameter of the presented symbol contained in the subsequent image is substantially similar to the at least one orientation parameter of the presented symbol contained in the first image; storing at least one of a plurality of parameters associated with capturing the presented symbol contained in the subsequent image in the memory when the at least one orientation parameter of the presented symbol contained in the subsequent image is substantially similar to the at least one orientation parameter of the presented symbol contained in the first image; and performing a tuning process based on at least one of the plurality of parameters stored in the memory.

To the accomplishment of the foregoing and related ends, the embodiments, then, comprise the features hereinafter fully described. The following description and annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

Figure 1:
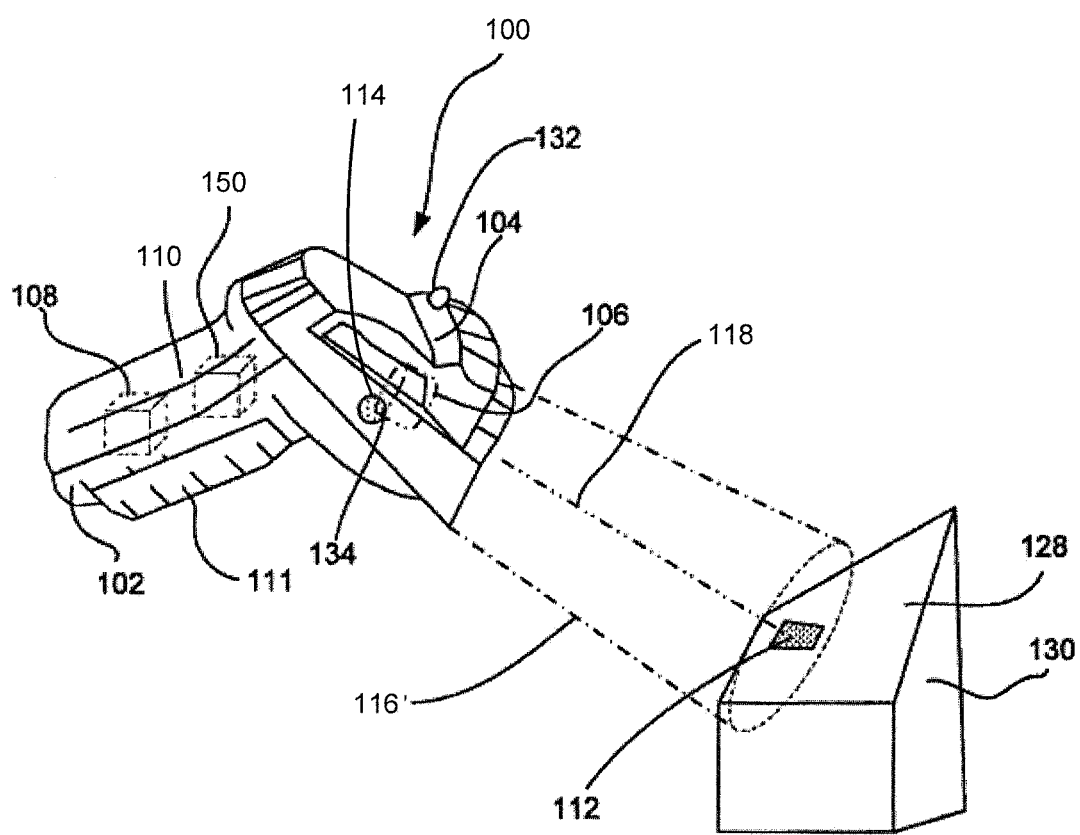
FIG. 1 is a perspective view of a typical handheld scanning device.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to control an electronic based device to implement aspects detailed herein.

Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which programs may be stored and/or data communications may be buffered. The term "memory" may also include other types of memory or combinations thereof.

Embodiments of the technology are described below by using diagrams to illustrate either the structure or processing of embodiments used to implement the embodiments of the present technology. Using the diagrams in this manner to present embodiments of the technology should not be construed as limiting of its scope. The present technology contemplates a handheld scanning device having an auto-tuning functionality that can account for changes in the orientation between the scanner and a presented symbol.

The various embodiments of an automatic tuning process will be described in connection with a handheld scanner, the scanner adapted to acquire an image of a presented symbol. That is because the features and advantages of the technology are well suited for this purpose. Still, it should be appreciated that the various aspects of the technology can be applied in other forms of imaging systems, including fixed mount imaging systems that may benefit from an auto tuning process having the features described herein.

Figure 2:
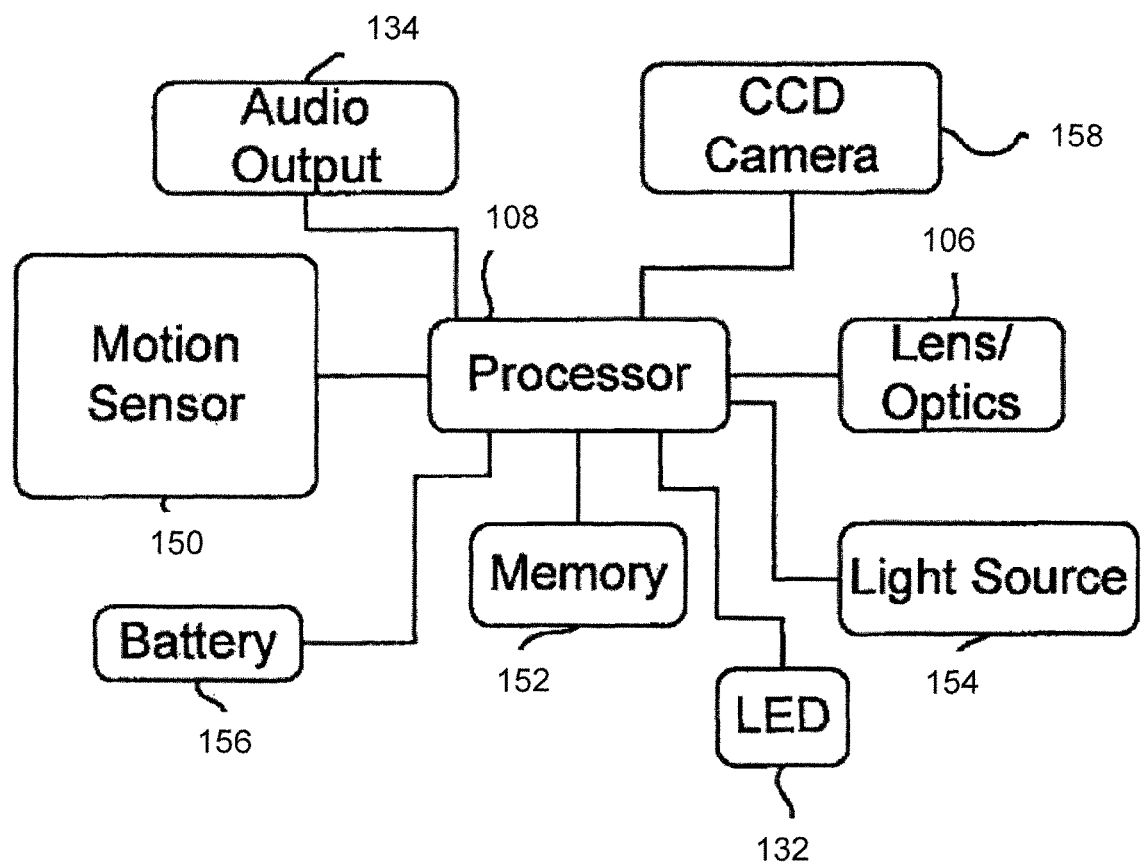
FIG. 2 is a schematic view of a typical handheld scanning device.

Referring now to FIGS. 1 and 2, the present technology will be described in the context of an exemplary handheld scanner 100 including a housing 110 having a grip section 102, a body/barrel section 104 with a trigger 111, a user input device 114, a CCD or other type of image sensor 158, optics/lenses 106, a motion sensor or accelerometer 150, a processor 108, one or more LEDs 132, a speaker/audio component 134, a power source, e.g., a battery 156, a memory 152 and a light source/subassembly 154. In one embodiment, the optics/lenses 106 can be a liquid lens type. In an alternative embodiment, the optics/lenses 106 can have a variable focus function. Each of the processor 108, motion sensor 150, battery 156, optics 106, memory 152 and light source 154 can be mounted in or otherwise supported by housing 110. Processor 108 can be linked to each of motion sensor 150, battery 156, memory 152, optics 106, camera/image sensor 158, light source 154, LEDs 132 and speaker/audio component 134. Processor 108 can execute programs stored in memory 152 to perform inventive processes.

In one embodiment, the light source 154 can provide illumination substantially parallel to a FOV axis 118 to provide a bright field illumination source. In a further embodiment, light source 154 can provide illumination nearly perpendicular to the FOV axis 118 to provide a dark field illumination source. Dark field illumination sources can result in a dark image with 3D features of a presented symbol 112 reflecting light back into the sensor 158.

Optics 106 focus a field of view 116 on a CCD or other type of image sensor device 158 within handheld scanner 100 which in turn generates data comprising an image of items located within the field of view 116. Field of view 116 is centered along a FOV axis 118. Thus, when the field of view 116 is directed toward a presented symbol 112 applied on a surface 128 of an item 130 and reader 100 is activated to generate an image, an image including the presented symbol 112 can be obtained.

Figure 3:
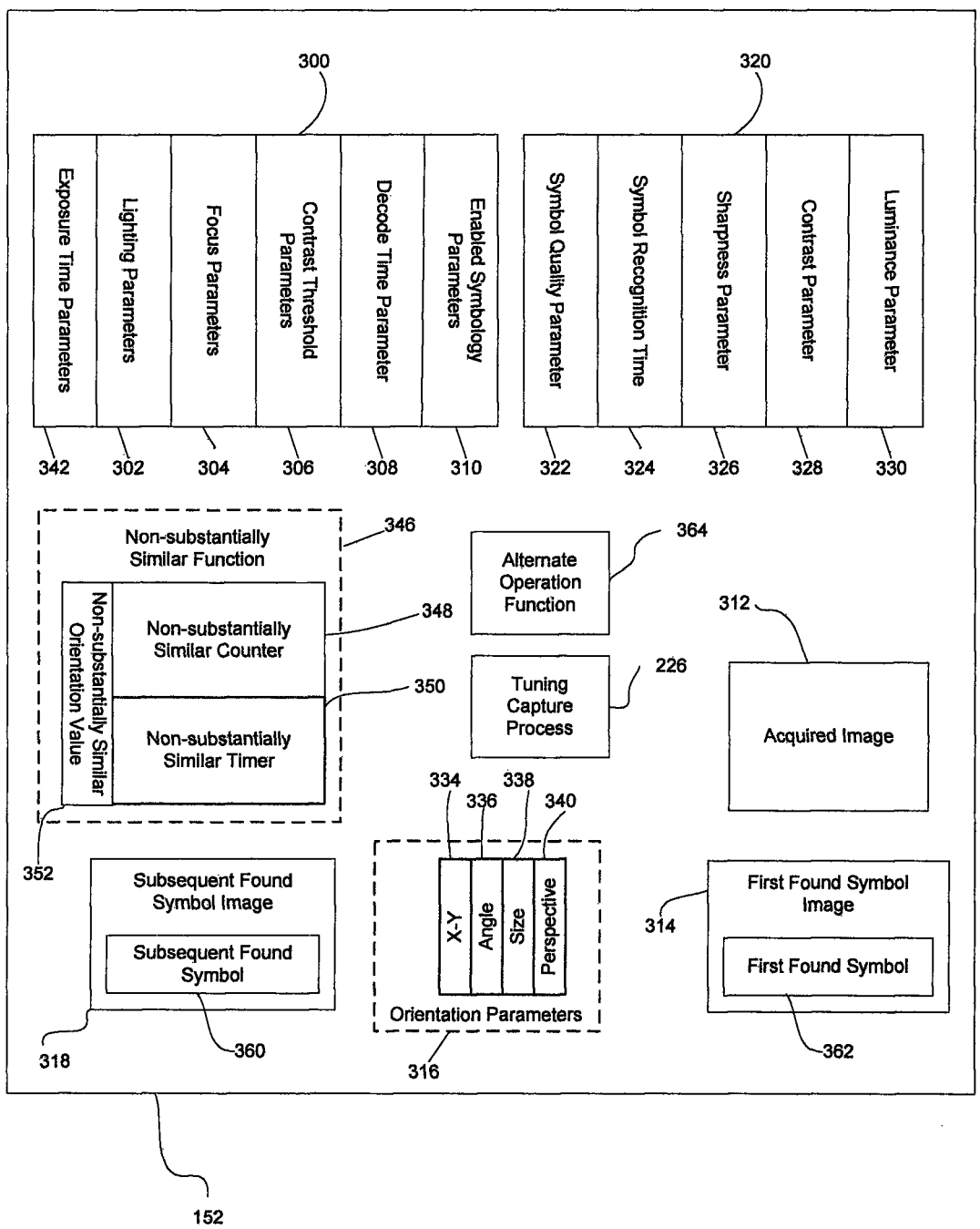
FIG. 3 is a schematic view of a typical memory of a handheld scanning device according to embodiments of the technology.

Referring now to FIG. 3, a block diagram of the memory 152 can be seen illustrating a non-limiting embodiment of possible data stored in the memory 152 of the handheld scanner 100. In one embodiment, the memory 152 can contain a plurality of tuning capture parameters 300. The tuning capture parameters 300 can be used to control how a presented image 112 is captured. The tuning capture parameters 300 can comprise a plurality of previously stored tuning capture parameters 300. In one embodiment, the tuning capture parameters 300 can be stored temporarily in the memory 152 of the handheld scanner 100 during manufacturing. In a further embodiment, the tuning capture parameters 300 can be tuning capture parameters 300 from previous auto-tuning processes 200 that were stored in the memory 152 of the handheld scanner 100. In a further embodiment, the tuning capture parameters 300 can be parameters that are to be determined during the current auto-tuning process 200.

In one embodiment, the tuning capture parameters 300 can include lighting parameters 302. The lighting parameters 302 can be comprised of a bright field lighting parameter or a dark field lighting parameter. In a further embodiment, the lighting parameters 302 can be a combination of the bright field lighting parameter and the dark field lighting parameter. In a further embodiment, the lighting parameters 302 can be the number of illumination sources 154 present on the handheld scanner 100. In a further embodiment, the lighting parameters 302 can include a position of the illumination sources 154. In a further embodiment, the lighting parameters 302 can include the type of illumination source 154 present on the handheld scanner 100. In yet another embodiment, the lighting parameters 302 can include the intensity of the illumination sources 154 present on the handheld scanner 100. In a further embodiment, the lighting parameters 302 can include the illumination duration of the illumination sources 154 present on the handheld scanner 100.

In still a further embodiment, the tuning capture parameters 300 can include a plurality of focus parameters 304. In one embodiment, the plurality of focus parameters 304 can be a reader-to-object distance of the focal plane parameter of the image sensor 158. In a further embodiment, the plurality of focus parameters 304 can include a diopter parameter. In a further embodiment, the plurality of focus parameters 304 can include an aperture size parameter of the optics/lenses 106. In still another embodiment, the plurality of focus parameters can include a calibrated distance from handheld scanner 100 to a best focal plane.

In further embodiments, parameters such as a plurality of contrast threshold parameters 306, a plurality of decode time parameters 308, a plurality of enabled symbology parameters 310, and a plurality of exposure time parameters 342 can also be included in the tuning capture parameters 300.

Figure 4:
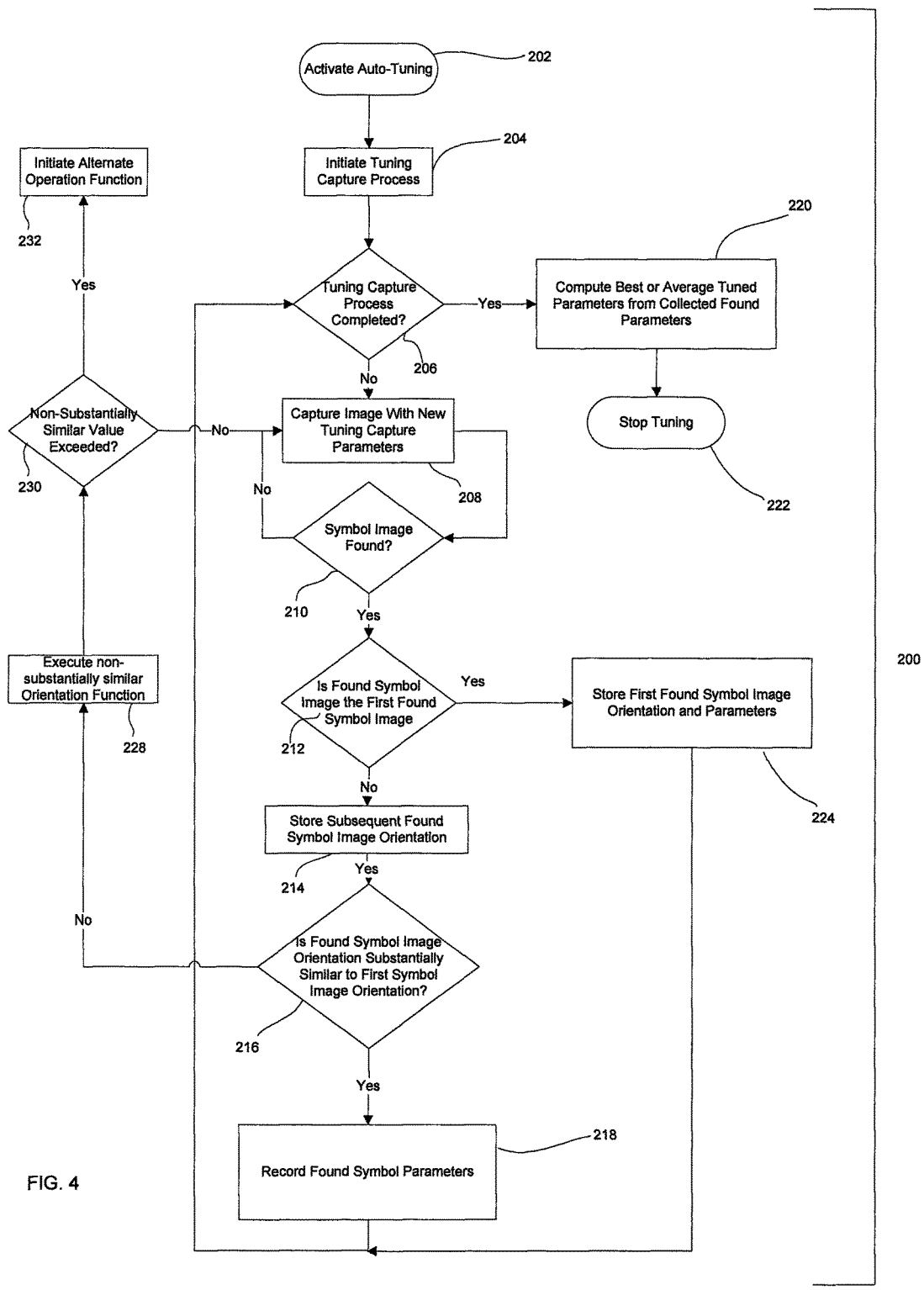
FIG. 4 is a flow chart showing an embodiment of an auto-tuning process according to embodiments of the technology.

Referring now to FIG. 4, a process flow chart for an auto-tuning process 200 can be seen. At process block 202, a user can activate an auto-tuning process 200. In one embodiment, the user can activate the auto-tuning process 200 by manually actuating the user input device 114 on the handheld scanner 100. In further embodiments, the handheld scanner 100 can automatically initiate the auto-tuning process 200 when a user depresses the trigger 111.

Once the auto-tuning process 200 has been activated, at process block 204, the auto-tuning process 200 can initiate a tuning capture process 226. In one embodiment, initiating the tuning capture process 226 can include selecting an initial value for the tuning capture parameters 300. The initial value for the tuning capture parameters 300 can be a pre-set value for the tuning capture parameters 300 set in the memory 152. In another embodiment, the initial value for the tuning capture parameters 300 can be a value based on a previous auto-tuning process 200.

In one embodiment, the tuning capture process 226 initiated at process block 204 can be a progressive sampling process as is known in the art. In the progressive sampling process, a plurality of found symbol parameters 320 are captured for various values of the tuning capture parameters 300 by capturing an acquired image 312 of a presented symbol 112. Initially, the values of the tuning capture parameters 300 can be varied in coarse step values. As a non-limiting example, there can exist one hundred focus parameters 304. The tuning capture process 226 in a first phase can capture a plurality of acquired images 312 using a focus parameter 304 interval of twenty-five (i.e., 0, 25, 50, 75, 100). Once the tuning capture parameters 300 varied in coarse steps are evaluated, a coarse initial region of the best tuning capture parameters 300 can be determined by the tuning capture process 226. Images can then be acquired of the found symbol using the values of the tuning capture parameters 300 within the coarse initial region determined by the tuning capture process 226. As a non-limiting example, the tuning capture process 226 in a second phase can then capture a plurality of acquired images 312 using a refined focus parameter interval of ten (i.e., 60, 70, 80, 90) within the coarse initial region. The successive refinement tuning capture process 226 can continue in this fashion, reducing the region of tuning capture parameter 300 values until the region of tuning capture parameter 300 values obtain a level of granularity required to provide effective symbol recognition. In one embodiment, the required granularity level can be pre-programmed into the handheld scanner 100. In an alternative embodiment, the required granularity level can by dynamically determined based on the presented symbols 112 being captured. In further embodiments, it should be known that the tuning capture process 226 can be a multi-resolution type, a multi-scale type, or a pyramid type tuning capture process 226. It is to be appreciated that in the successive refinement tuning capture process 226, use of any or combinations of the focus parameters 304 described above is contemplated.

At decision block 206, the auto-tuning process 200 can determine if the tuning capture process 226 has been completed. In one embodiment, the image capture process 226 can be determined to be complete when the found symbol parameters 320 are recorded for the values of the tuning capture parameters 300 at the smallest granular level required to ensure symbol recognition.

If the image capture process 226 has not yet been completed, the auto-tuning process 200, at process block 208, can direct the handheld scanner 100 to capture an acquired image 312 of a presented symbol 112 by modifying a value of the tuning capture parameters 300. In one embodiment, the modified values of the tuning capture parameters 300 can include modifying values of the lighting parameters 302, focus parameters 304, or any other tuning capture parameters 300 available in the auto-tuning process 200. In a further embodiment, modifying the value of the tuning capture parameters 300 can include modifying the value of a combination of the tuning capture parameters 300 available in the auto-tuning process 200.

At decision block 210, the auto-tuning process 200 can determine if the presented symbol 112 was successfully found in the acquired image 312. In one embodiment, the auto-tuning process 200 can determine if a presented symbol 112 was successfully found where the presented symbol 112 is recognized. In a further embodiment, the auto-tuning process 200 can determine if a presented symbol 112 was successfully found by using decoded data and trusting the data is correct due to the specified error-detection capability of certain symbology types (Reed-Solomon, check-sum, parity bit, etc) on the presented symbol. In a further embodiment the auto-tuning process 200 can determine if a presented symbol 112 was successfully found by using the number of rows and columns, error correction type, error correction level or capacity or other properties of the physical mark. In a further embodiment, the auto-tuning process can determine if a presented symbol 112 was successfully found by applying a pattern matching algorithm to the presented symbol 112. In a further embodiment, an OCR algorithm can be applied to the presented symbol where the presented symbol 112 is a string of text to determine if the presented symbol 112 was successfully found. In a further embodiment, other metrics such as symbol orientation, scale, may be used to determine if the presented symbol 112 was successfully found. In a further embodiment, the auto-tuning process 200 can determine if a presented symbol 112 was successfully found by comparing a pattern of the presented symbol 112 to a derived matching metric such as a combination of matched decoded data and symbol orientation. Other matching metrics derived from other methods or in a combination with methods described above are contemplated.

If the presented symbol 112 was not successfully found, the auto-tuning process 200 can return to process block 208 and again attempt to successfully acquire an image of the presented symbol 112. If the presented symbol 112 is successfully found, the auto-tuning process 200 can then evaluate, at decision block 212, if the found presented symbol 112 was a first found symbol image 314 acquired in the auto-tuning process 200.

At process block 224, if the auto-tuning process 200 determines that the acquired image 312 of the presented symbol 112 is the first found symbol image 314 to be acquired of the presented symbol 112 in the auto-tuning process 200, the auto-tuning process 200 can store the first found symbol image 314 of the presented symbol 112 into the memory 152 of the handheld scanner 100. In further embodiment, the auto-tuning process 200 can store the first found symbol image 314 of the presented symbol 112 into the memory 152 of the handheld scanner 100 temporarily.

In one embodiment, at process block 224, the auto-tuning process 200 can record a plurality orientation parameters 316 of a first found symbol 362 in the first found symbol image 314 of the presented symbol 112. The plurality of orientation parameters 316 can include, for example, an x-y position 334, an angle 336, a size 338 and/or a perspective 340. In one embodiment, the auto-tuning process 200 can record at least one of the plurality of orientation parameters 316. In other embodiments, only a single orientation parameter 316 may be recorded. In alternate embodiments, a plurality of orientation parameters 316 may be recorded.

Figure 5:
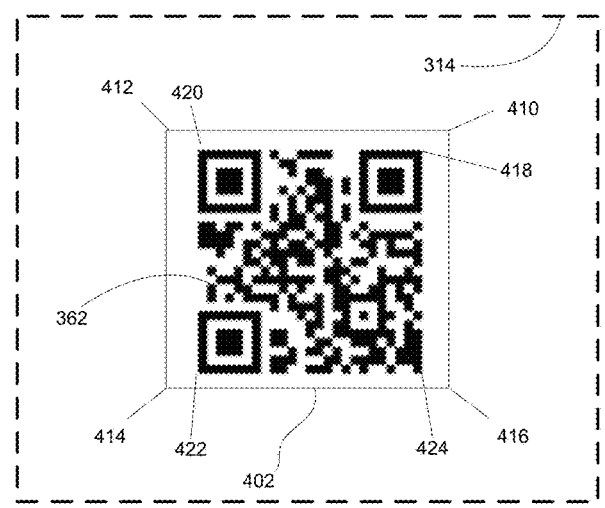
FIG. 5 is a representative view of applying a bounding area to a first found image of a presented symbol.

Turning briefly to FIG. 5, a bounding area 402 can be determined around the first found symbol 362 in the first found symbol image 314. In one embodiment, the bounding area 402 can represent the presented symbol 112 orientation. In another embodiment, the bounding area 402 can define the location of the presented symbol 112. In one embodiment, the bounding area 402 can be in the x-y direction. In a further embodiment, the bounding area 402 is set to have a larger area than the area covered by the first found symbol 362 in the first found symbol image 314. In a further embodiment, the auto-tuning process 200 can calculate the bounding area 402 to be a set percentage larger than the first found symbol 362 in the first found symbol image 314. In a further embodiment, the bounding area 402 can be 10%-100% larger than the first found symbol 362 in the first found symbol image 314.

Returning now to FIG. 4, and continuing with process block 224, the auto-tuning process 200 can also record the found symbol parameters 320 associated with the first found symbol 362 in the first found symbol image 314. In one embodiment, the plurality of found symbol parameters 320 can be a symbol quality parameter 322. In a further embodiment, the found symbol parameters 320 can be a symbol recognition time parameter 324. In a further embodiment, the found symbol parameters 320 can be a sharpness parameter 326. In one embodiment, the found symbol parameters 320 can be a contrast parameter 328. In yet a further embodiment, the found symbol parameters 320 can be a luminance parameter 330.

In determining that the acquired image 312 of the presented symbol 112 is not the first found symbol image 314 to be acquired of the presented symbol 112, at process block 214, the auto-tuning process 200 can store the acquired image 312 as a subsequent found symbol image 318 of the presented symbol 112 into the memory 152 of the handheld scanner 100.

Figure 6:
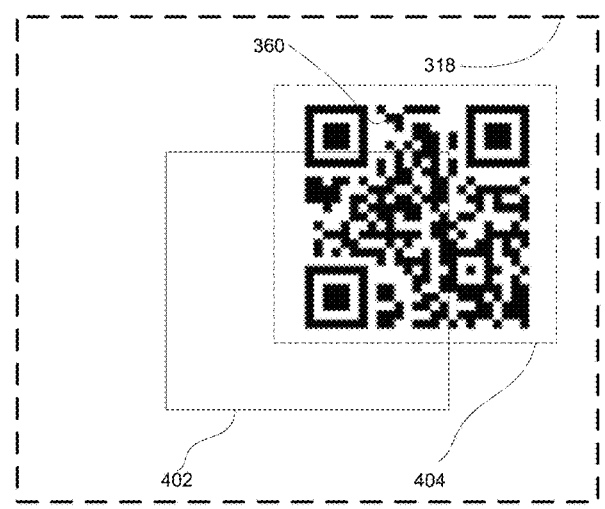
FIG. 6 is a representative view of using a bounding area to determine a change of a position of a presented symbol.

Turning now briefly to FIG. 6 as an example, a subsequent bounding area 404 can also be determined around a subsequent found symbol 360 in the subsequent found symbol image 318. In one embodiment, the subsequent bounding area 404 can represent the presented symbol 112 orientation. In another embodiment, the subsequent bounding area 404 can define the location of the presented symbol 112. In one embodiment, the subsequent bounding area 404 can be in the x-y direction. In a further embodiment, the subsequent bounding area 404 is set to have a larger area than the area covered by the subsequent found symbol 360 in the subsequent found symbol image 318. In a further embodiment, the auto-tuning process 200 can calculate the subsequent bounding area 404 to be a set percentage larger than the subsequent found symbol 360 in the subsequent found symbol image 318. In a further embodiment, the subsequent bounding area 404 can be 10%-100% larger than the first found symbol 362 in the first found symbol image 314.

Continuing with process block 214, in one embodiment, the auto-tuning process 200 can store the orientation parameter 316 of the subsequent found symbol 360 in the subsequent found symbol image 318 in the memory 152 of the handheld scanner 100. In a further embodiment, the orientation parameter 316 can be an x-y position 334. In a further embodiment, the orientation parameter 316 can an angle 336. In yet a further embodiment, the orientation parameter 316 can be a size 338. In a further embodiment, the orientation parameter 316 can be a perspective 340.

At decision block 216, the auto-tuning process 200 can compare the orientation parameter 316 of a first found symbol 362 in the first found symbol image 314 to the orientation parameter 316 of the subsequent found symbol 360 in the subsequent found symbol image 318. Continuing with decision block 216, the auto-tuning process 200 can evaluate a difference between the first found symbol 362 in the first found symbol image 314 and the subsequent found symbol 360 in the subsequent found symbol image 318 by comparing the positions of the first found symbol 362 in the first found symbol image 314 and the subsequent found symbol 360 in the subsequent found symbol image 318 in the same plane to determine if the orientation of the first found symbol 362 in the first found symbol image 314 and the subsequent found symbol 360 in the subsequent found symbol image 318 are substantially similar.

In one embodiment, the auto-tuning process 200, by evaluating whether the orientation parameter 316 of the first found symbol 362 in the first found symbol image 314 and the subsequent found symbol 360 in the subsequent found symbol image 318 are substantially similar, can determine if the user has moved the handheld scanner 100 during the auto-tuning process 200, and/or that the presented image 112 has moved. In one embodiment, if the auto-tuning process 200 determines that the orientation between the presented symbol 112 and the handheld scanner 100 has changed by an unacceptable degree, the auto-tuning process 200 can return to process block 208 to attempt the auto-tuning process 200 again.

Turning to FIG. 6, in one embodiment, the auto-tuning process 200 can determine if the subsequent found symbol 360 of the subsequent found symbol image 318 is substantially similar to the orientation parameter 316 of the first found symbol 362 in the first found symbol image 314 by evaluating whether the subsequent found symbol 360 in the subsequent found symbol image 318 is located within the bounding area 402 of the first found symbol image 314 in the x and/or y directions. In a further embodiment, the auto-tuning process 200 can determine if the subsequent found symbol 360 in the subsequent found symbol image 318 is substantially similar to the orientation parameter 316 of the first found symbol 362 in the first found image 314 where the position of the subsequent found symbol 360 in the subsequent found symbol image 318 does not vary by more than a pre-determined value in the x and/or y directions from the bounding area 402 of the first found symbol image 314. In a further embodiment, as a non-limiting example, the pre-determined value can be 50%. In a further embodiment, the user can select the pre-determined value.

Figure 7:
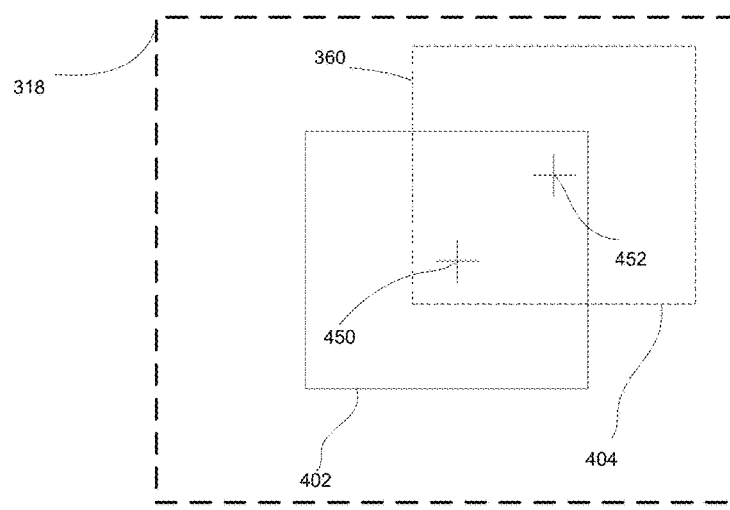
FIG. 7 is a representative view of using a bounding area and a subsequent bounding area to determine a change of position of a presented symbol.

Turning now to FIG. 7, in a further embodiment, the auto-tuning process 200 can determine if the subsequent found symbol 360 in the subsequent found symbol image 318 is substantially similar to the orientation parameter 316 of the first found symbol 362 in the first found image 314 by evaluating whether the subsequent bounding area 404 is located within the bounding area 402 of the first found symbol image 314 in the x and/or y directions. In a further embodiment, the auto-tuning process 200 can determine if the subsequent found symbol 360 in the subsequent found symbol image 318 is substantially similar to the orientation parameter 316 of the first found symbol 362 in the first found symbol image 314 where the subsequent bounding area 404 does not vary by more than a pre-determined value in the x and/or y direction from the bounding area 402 of the first found symbol image 314. In a further embodiment, as a non-limiting example, the pre-determined value can be 50%. In a further embodiment, the user can select the pre-determined value.

In still a further embodiment, the auto-tuning process 200 can determine if the subsequent found symbol 360 in the subsequent found symbol image 318 is substantially similar to the orientation parameter 316 of the first found symbol 362 in the first found symbol image 314 where a center 452 of the subsequent bounding area 404 does not vary by more than a pre-determined value in the x and/or y directions from a center 450 of the bounding area 402 of the first found symbol image 314. In a further embodiment, the auto-tuning process 200 can determine if the subsequent found symbol 360 in the subsequent found symbol image 318 is substantially similar to the orientation parameter 316 of the first found symbol 362 in the first found symbol image 314 where the center 452 of the subsequent bounding area 404 is located within the bounding area 402 of the first found symbol image 314.

In further embodiments, the auto-tuning process 200 can compare the size 338 of first found symbol 362 in the first found symbol image 314 and the size 338 of the subsequent found symbol 360 in the subsequent found symbol image 318 to determine if the images are substantially similar. In one embodiment, the size may be measured by the area of the symbol. In another embodiment, the size may be measured by the number of foreground or number of background pixels of the symbol.

Figure 8:
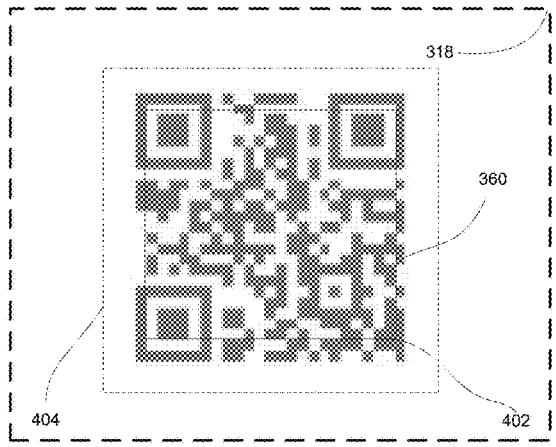
FIG. 8 is a representative view of using a bounding area to determine an increase in size of a presented symbol.

Turning now to FIG. 8, in one embodiment, the auto-tuning process 200 can determine if the size 338 of the first found symbol 362 in the first found symbol image 314 and the size 338 of the subsequent found symbol 360 in the subsequent found symbol image 318 are not substantially similar if the area of the subsequent found symbol 360 is not within an acceptable scale delta of the bounding area 402 of the first found symbol 362 in the first found image 314. In one embodiment, as a non-limiting example, the acceptable scale delta can be a 50% delta. In another embodiment, the user can select the acceptable scale delta.

Figure 9:
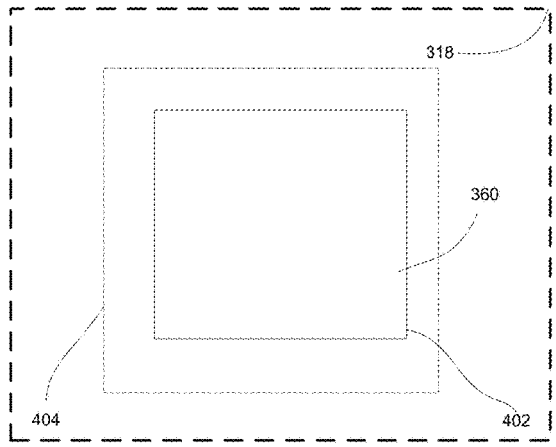
FIG. 9 is a representative view of using a bounding area and a subsequent bounding area to determine an increase in size of a presented symbol.

Turning now to FIG. 9, in another embodiment, the auto-tuning process 200 can determine if the size 328 of the first found symbol 362 in the first found symbol image 314 and the size 338 of the subsequent found symbol 360 in the subsequent found symbol image 318 are not substantially similar if the area of the subsequent bounding area 404 of the subsequent found symbol image 318 exceeds the bounding area 402 of the first found symbol image 314 by a pre-determined value. In one embodiment, as a non-limiting example, the pre-determined value can be 50%. In another embodiment, the user can select the pre-determined value.

Figure 10:
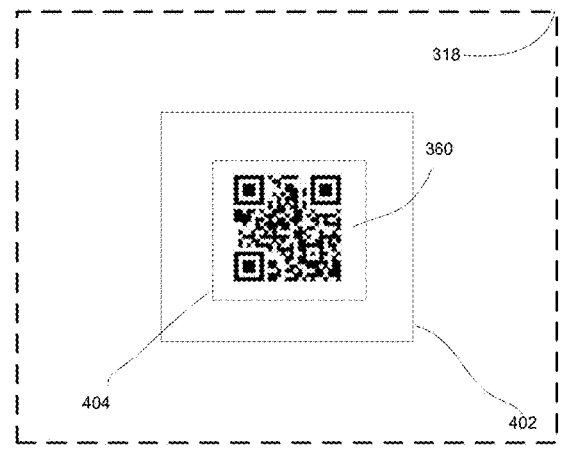
FIG. 10 is a representative view of using a bounding area to determine a decrease in size of a presented symbol.

Turning now to FIG. 10, in one embodiment, the auto-tuning process 200 can determine if the size 338 of the first found symbol 362 in the first found symbol image 314 of the and the size 338 of the subsequent found symbol 360 in the subsequent found symbol image 318 are not substantially similar if the area of the subsequent found symbol 360 in the subsequent found symbol image 318 is less than a pre-determined value of the area of the bounding area 402 of the first found symbol image 314. In a further embodiment, as a non-limiting embodiment, the pre-determined value can be 50%. In another embodiment, the user can select the pre-determined value.

Figure 11:
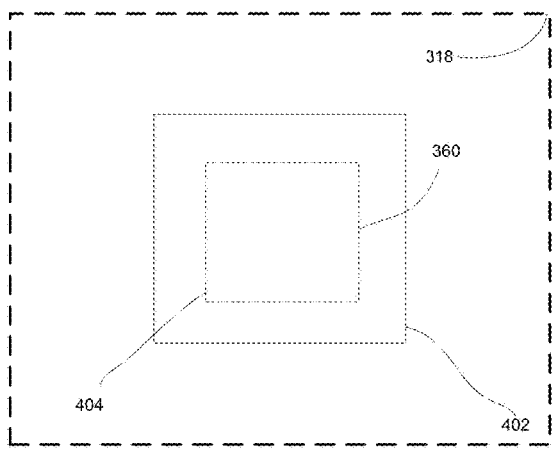
FIG. 11 is a representative view of using a bounding area and a subsequent bounding area to determine an decrease in size of a presented symbol.

Turning now to FIG. 11, in one embodiment, the auto-tuning process 200 can determine if the size 338 of the first found symbol 362 in the first found symbol image 314 and the size 338 of the subsequent found symbol 360 in the subsequent found symbol image 318 are not substantially similar if the area of the subsequent bounding area 404 of the subsequent found symbol image 318 is less than a pre-determined value of the area of the bounding area 402 of the first found symbol image 314. In one embodiment, as a non-limiting example, the pre-determined value can be 50%. In another embodiment, the user can select the pre-determined value.

In still further embodiments, the auto-tuning process 200 can compare the angle 336 of the first found symbol 362 in the first found symbol image 314 and the angle 336 of the subsequent found symbol 360 in the subsequent found symbol image 318 to determine if the first found symbol 362 in the first found symbol image 314 and the subsequent found symbol 360 in the subsequent found symbol image 318 are substantially similar. In one embodiment, the auto-tuning process 200 can determine that the angle 336 of the first found symbol 362 in the first found symbol image 314 and the angle 336 of the subsequent found symbol 360 in the subsequent found symbol image 318 are substantially similar if the angle 336 of the subsequent found symbol 360 in the subsequent found symbol image 318 is within 10 degrees, as a non-limiting example, of the angle 336 of the first found symbol 362 in the first found symbol image 314.

Figure 12:
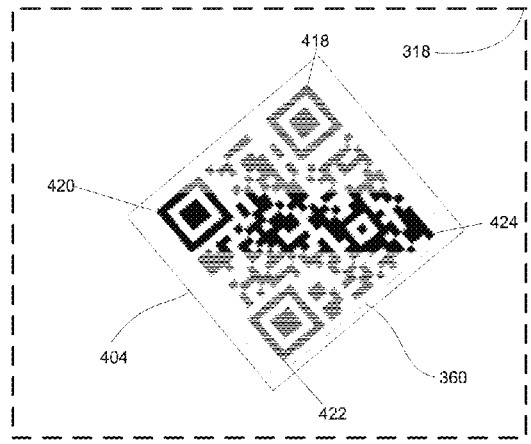
FIG. 12 is a representative view of determining a change in angle of a presented symbol.

Turning now to FIG. 12, in one embodiment, the auto-tuning process 200 can determine if the angle 336 of the first found symbol 362 in the first found symbol image 314 and the angle 336 of the subsequent found symbol 360 in the subsequent found symbol image 318 are not substantially similar if the relative position of the four-corners 418, 420, 422, 424 of the subsequent found symbol 360 in the subsequent found symbol image 318 of the presented symbol 112 vary by more than a pre-determined value from the four-corners 418, 420, 422, 424 of the first found symbol 362 in the first found symbol image 314. In one embodiment, the pre-determined value can be a 10% variation in relative positions. In another embodiment, the user can select the pre-determined value.

Figure 13:
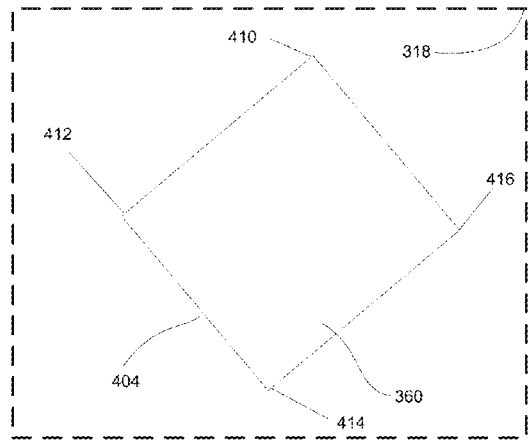
FIG. 13 is a representative view of using a bounding area and a subsequent bounding area to determine a change in angle of a presented symbol.

Turning now to FIG. 13, in one embodiment, the auto-tuning process 200 can determine if the angle 336 of the first found symbol 362 in the first found symbol image 314 and the angle 336 of the subsequent found symbol 360 in the subsequent found symbol image 318 are not substantially similar if the relative position of the four-corners 410, 412, 414, 416 of the subsequent bounding area 404 vary by more than a pre-determined value from the relative position of the four-corners 410, 412, 414, 416 of the bounding area 402 of the first found symbol image 314. In one embodiment, the pre-determined value can be a 10% variation in relative positions. In another embodiment, the user can select the pre-determined value.

In still further embodiments, the auto-tuning process 200 can compare the perspective 340 of the first found symbol 362 in the first found symbol image 314 and the perspective 340 of the subsequent found symbol 360 in the subsequent found symbol image 318 to determine if the first found symbol 362 in the first found symbol image 314 and the subsequent found symbol 360 in the subsequent found symbol image 318 are substantially similar. In one embodiment, the auto-tuning process 200 can determine that the perspective 340 of the first found symbol 362 in the first found symbol image 314 and the perspective 340 of the subsequent found symbol 360 in the subsequent found symbol image 318 are substantially similar if the perspective 340 of the subsequent found symbol 360 in the subsequent found symbol image 318 is within 10 degrees, as a non-limiting example, of the perspective 340 of the first found symbol 362 in the first found symbol image 314.

Figure 14:
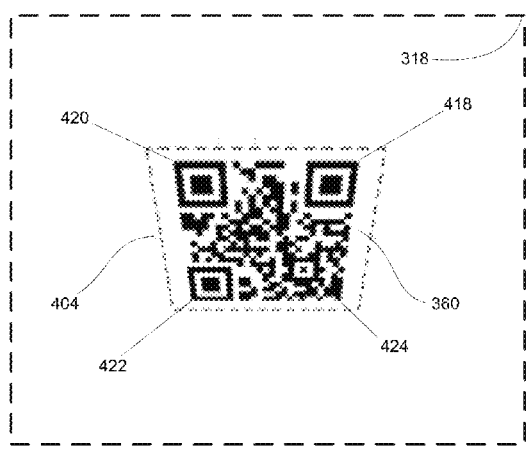
FIG. 14 is a representative view of determining a change in perspective of a presented symbol.

Turning now to FIG. 14, in one embodiment, the auto-tuning process 200 can determine if the perspective 340 of the first found symbol 362 in the first found symbol image 314 and the perspective 340 of the subsequent found symbol 360 in the subsequent found symbol image 318 are not substantially similar if the relative distance between the four-corners 418, 420, 422, 424 of the subsequent found symbol 360 in the subsequent found symbol image 318 vary by more than a pre-determined value from the distance between the four-corners 418, 420, 422, 424 of the first found symbol 362 in the first found symbol image 314. In one embodiment, the pre-determined value can be a 10% variation in relative distance. In another embodiment, the user can select the pre-determined value.

Figure 15:
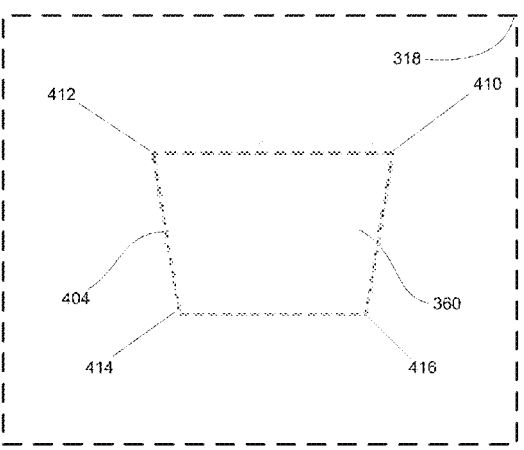
FIG. 15 is a representative view of using a bounding area and a subsequent bounding area to determine a change in perspective of a presented symbol.

Turning now to FIG. 15, in one embodiment, the auto-tuning process 200 can determine if the perspective 340 of the first found symbol 362 in the first found symbol image 314 and the perspective 340 of the subsequent found symbol 360 in the subsequent found symbol image 318 are not substantially similar if the relative distance between the four-corners 410, 412, 414, 416 of the subsequent bounding area 404 of the subsequent found image 318 vary by more than a pre-determined value from the distance between the four-corners 410, 412, 414, 416 of the bounding area 402 of the first found symbol image 314. In one embodiment, the pre-determined value can be a 10% variation in relative distance. In another embodiment, the user can select the pre-determined value.

The auto-tuning process 200, determining that the subsequent found symbol 360 in the subsequent image 318 is not substantially similar to the first found symbol 362 in the first found symbol image 314, can return to process block 208 to attempt to acquire a subsequent found symbol 360 in subsequent found symbol image 318 that is substantially similar to the first found symbol 362 in the first found symbol image 314.

In one embodiment, the auto-tuning process 200, at decision block 216, determining that the first found symbol 362 in the first found symbol image 314 of the presented symbol 112 and the subsequent found symbol 360 in the subsequent found image 318 of the presented symbol 112 are not substantially similar, can, at process block 228, execute a non-substantially similar orientation function 346. In one embodiment, the non-substantially similar orientation function 346 can contain a non-substantially similar orientation value 352. In one embodiment, the non-substantially similar orientation value 352 can be a non-substantially similar orientation counter 348. In an alternate embodiment, the non-substantially similar orientation value 352 can be a non-substantially similar orientation timer 350. In one embodiment, if the auto-tuning process 200 determines that the first found symbol 362 in the first found symbol image 314 and the subsequent found symbol 360 in the subsequent found symbol image 318 are not substantially similar, the auto-tuning process 200 can increment the non-substantially similar orientation counter 348. In still a further embodiment, when the auto-tuning process 200 determines that the first found symbol 362 in the first found symbol image 314 and the subsequent found symbol 360 in the subsequent found symbol image 318 are not substantially similar, the auto-tuning process 200 can begin the non-substantially similar orientation timer 350. In a further embodiment, the tuning capture process can be re-initiated at process block 204. At decision block 230, the auto-tuning process 200 can determine if the non-substantially similar orientation value 352 exceeds a pre-determined value. In one embodiment, at decision block 230, the auto-tuning process 200 can return to process block 208 were the substantially similar orientation value 352 does not exceed the pre-determined value.

Continuing with decision block 230, in one embodiment, the auto-tuning process 200 can initiate an alternate operation function 364 at process block 232 when the non-substantially similar orientation value 352 exceeds a pre-determined value. In one embodiment, the auto-tuning process 200 may initiate the alternate operation function 364 at process block 232 after 20 failed attempts, as a non-limiting example. In a further embodiment, at process block 232 the auto-tuning process 200 can initiate the alternate operation function 364 if the auto-tuning process 200 does not capture a first found symbol 362 in the first found symbol image 314 and a subsequent found symbol 360 in the subsequent found symbol image 318 that are substantially similar within a pre-determined amount of time. In one embodiment, as a non-limiting example, the pre-determined time can be five seconds. In a further embodiment, as a non-limiting example, the pre-determined time can be one-half second. In yet a further embodiment, the pre-determined time can be a variable time set by a user.

In one embodiment, the alternate operation function 364 can abort the auto-tuning process 200. In one embodiment, aborting the auto-tuning process 200 can delete all found parameters 320 collected during the current auto-tuning process 200 can be removed from the memory 152. In a further embodiment, the auto-tuning process 200 can abort the current auto-tuning process 200 at process block 232 and re-initiate the tuning capture process 226 at process block 204.

In a further embodiment, the alternate operation function 364 can be a restart function. The restart function can restart the auto-tuning process 200. The restart function can be initiated where the orientation parameters 316 of the subsequent found symbol 360 in the subsequent found images 318 change rapidly compared to the orientation parameters 316 of the first found symbol 362 in the first found symbol image 314, followed by consistent orientation parameters 316 of the subsequent found symbol 360 in the subsequent found symbol image 318, indicating that the relationship between the position of the handheld scanner 100 and the presented symbol 112 has stabilized. In one embodiment, the restart function can ignore the found symbol parameters 320 associated with the first found symbol image 314, reset the tuning capture parameters 300 and restart the auto-tuning process 200.

In further embodiments, the alternate operation function 364 can be a resume function. The resume function can ignore spurious found symbol parameters 320 captured during the auto-tuning process 200 and continue the auto-tuning process 200. In a further embodiment, the alternate operation function 364 can be a retest function. The retest function can capture a subsequent found symbol image 318 using previous tuning capture parameters 300 to verify the found symbol parameters 320.

The auto-tuning process 200, determining that a subsequent found symbol 360 in the subsequent found symbol image 318 is substantially similar to a first found symbol 362 in the first found symbol image 314 can record the tuning capture parameters 300 and the found symbol parameters 320 in the memory 152 at process block 218. Upon recording the tuning capture parameters 300 and the found symbol parameters 320, the auto-tuning process 200 can again evaluate, at decision block 206, whether the tuning capture process 226 has been completed Where the tuning capture process 226 is not complete, the auto-tuning process 200 can return to process block 208 to continue the auto-tuning process 200.

The auto-tuning process 200, determining at decision block 206 that the tuning capture process 226 has been completed, can proceed to process step 220 and compute the best and/or average tuning capture parameters 300 by evaluating the found symbol parameters 320 in combination with the tuning capture parameters 300. In one embodiment, once the best and/or average plurality of tuning capture parameters 300 are determined, the auto-tuning process 200 can be completed at process block 222.

Although the present technology has been described with reference to preferred embodiments, workers skilled in the art will recognize that changes may be made in form and detail without departing from the spirit and scope of the technology. For example, the present technology is not limited to a tuning process for a handheld scanner, and may be practiced with other scanner related systems. For example, although a handheld system is shown and described above, the scanning system can be a fixed mount system. In a fixed mount system, the symbol to be imaged can be moving that could make the tuning process more complicated.

The particular embodiments disclosed above are illustrative only, as the technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. A method for auto-tuning a handheld scanning device, the method comprising the steps of:
    a) acquiring a plurality of images of an image scene using the handheld scanning device, the acquiring including varying at least one parameter as part of an auto-tuning process, the image scene including at least one target;
    b) estimating an orientation of the handheld scanning device relative to the at least one target for at least a portion of the plurality of images;
    c) determining that the orientation of the handheld scanning device relative to the at least one target has changed in an amount that exceeds a pre-determined value for a pre-determined time period; and
    d) terminating the auto-tuning process.

2. The method of claim 1, wherein the measuring the orientation of step b) includes measuring an orientation of the handheld scanning device relative to the image scene.

3. The method of claim 2, wherein the measuring the orientation of the handheld scanning device relative to the image scene utilizes a motion sensor or an accelerometer configured to sense motion of the handheld scanning device.

4. The method of claim 3, wherein the pre-determined value is selected from the group consisting of a pre-determined translation value, a pre-determined rotation value, and combinations thereof.

5. The method of claim 1, wherein the measuring the orientation of step b) includes determining if a size of a feature corresponding to the at least one target is substantially similar in the at least a portion of the plurality of images.

6. The method of claim 1, wherein the measuring the orientation of step b) includes determining if an angle between at least two features corresponding to the at least one target is substantially similar in the at least a portion of the plurality of images.

7. The method of claim 1, wherein the measuring the orientation of step b) includes determining if a perspective between a camera optical axis of the handheld scanning device relative to the at least one target is substantially similar in the at least a portion of the plurality of images.

8. The method of claim 1, wherein the at least one parameter includes a luminance parameter, an exposure parameter, a gain parameter, or a combination thereof.

9. The method of claim 1, the method further comprising restarting the auto-tuning process.

10. The method of claim 1, the method further comprising resuming the auto-tuning process.

11. The method of claim 1, the method further comprising recording the at least one parameter for each of the plurality of images.

12. The method of claim 1, the method further comprising recording the orientation of the handheld scanning device relative to the at least one target.

13. The method of claim 1, wherein the pre-determined time period is in a range of about 0.5 seconds to about 5 seconds.

14. The method of claim 1, wherein the changed orientation determined in step c) is at least partly a result of the handheld scanning device moving relative to the at least one target.

15. The method of claim 1, wherein the changed orientation determined in step c) is at least partly a result of the at least one target moving relative to the handheld scanning device.

16. The method of claim 1, the method further comprising, prior to step a), initiating the auto-tuning process.

17. The method of claim 1, wherein the at least one target is a presented symbol and the method further comprises decoding the presented symbol.

18. A method for auto-tuning a handheld scanning device, the method comprising the steps of:
    capturing a first image of an image scene including a machine readable symbol;
    capturing a second image of the image scene including the machine readable symbol, the
    second image captured with one or more capture attributes that are different than the first image;
    determining if a first orientation parameter of a first feature in the first image is substantially similar to a second orientation parameter of a second feature in the second image, the first feature and the second feature corresponding to the same target in the image scene; and either:
    recording a parameter associated with capturing the second image when the second orientation parameter is substantially similar to the first orientation parameter; or
    performing a non-substantially similar function when the second orientation parameter is not substantially similar to the first orientation parameter.

19. An auto-tuning handheld scanning device for recognizing presented symbols, the device comprising:

an image sensor;

a memory operatively coupled to the image sensor; and a processor operatively coupled to the image sensor and the memory, the processor programmed to perform the steps of:

capturing a first image of an image scene including a machine readable symbol;

capturing a second image of the image scene including the machine readable symbol, the second image captured with one or more capture attributes that are different than the first image;

determining if a first orientation parameter of a first feature in the first image is substantially similar to a second orientation parameter of a second feature in the second image, the first feature and the second feature corresponding to the same target in the image scene; and either:

recording a parameter associated with capturing the second image when the second orientation parameter is substantially similar to the first orientation parameter; or performing a non-substantially similar function when the second orientation parameter is not substantially similar to the first orientation parameter.

* * * * *